United States Patent
Glenat et al.

(10) Patent No.: US 9,844,949 B2
(45) Date of Patent: Dec. 19, 2017

(54) INK COMPOSITIONS

(71) Applicant: Sensient Colors LLC, St. Louis, MO (US)

(72) Inventors: Claire Glenat, Excenevex (FR); William Watson, Rantechaux (FR); Pascal Gruffel, Crissier (CH); Martial Blanc, Orbe (CH); Rudy Grosso, Balocco (IT)

(73) Assignee: Sensient Colors LLC, St. Louis, MO (US)

( * ) Notice: Subject to any disclaimer, the term of this patent is extended or adjusted under 35 U.S.C. 154(b) by 0 days.

(21) Appl. No.: 14/767,277

(22) PCT Filed: Feb. 12, 2014

(86) PCT No.: PCT/US2014/016116
§ 371 (c)(1),
(2) Date: Aug. 11, 2015

(87) PCT Pub. No.: WO2014/127050
PCT Pub. Date: Aug. 21, 2014

(65) Prior Publication Data
US 2016/0002847 A1 Jan. 7, 2016

Related U.S. Application Data

(60) Provisional application No. 61/763,816, filed on Feb. 12, 2013.

(51) Int. Cl.
*B41J 2/21* (2006.01)
*D06P 5/30* (2006.01)
(Continued)

(52) U.S. Cl.
CPC ........... *B41J 2/2107* (2013.01); *C09B 67/009* (2013.01); *C09D 11/328* (2013.01); *C09D 11/38* (2013.01);
(Continued)

(58) Field of Classification Search
CPC ......... C09D 11/36; C09D 11/40; C09D 11/30; C09D 11/38; C09D 11/322; C09D 11/328;
(Continued)

(56) References Cited

U.S. PATENT DOCUMENTS 4,385,901 A * 5/1983 Podder ............... C09B 67/0084
106/31.37
4,599,087 A 7/1986 Heller et al.
(Continued)

FOREIGN PATENT DOCUMENTS

WO 2008/052962 5/2008

OTHER PUBLICATIONS

Sigma-Aldrich; Disperse Blue 14, Product Specification and MSDS; Version 5.2; Revision Date Oct. 13, 2016; pp. 1-7.*
(Continued)

*Primary Examiner* — Manish S Shah
(74) *Attorney, Agent, or Firm* — Michael Best & Friedrich LLP

(57) ABSTRACT

A composition including a disperse dye and an aqueous carrier having a first polyol and a second polyol having at least 5 carbon has atoms, wherein the composition has a color fastness to water of at least 3 according to International Organization for Standardization test ISO 105-EO1:2010 when used in direct inkjet printing on a ready-to-print polyester textile.

19 Claims, 4 Drawing Sheets

(51) Int. Cl.
*D06P 1/613* (2006.01)
*C09B 67/46* (2006.01)
*C09D 11/328* (2014.01)
*C09D 11/38* (2014.01)
*D06P 1/18* (2006.01)
*D06P 1/20* (2006.01)
*D06P 1/44* (2006.01)

(52) U.S. Cl.
CPC .................. *D06P 1/18* (2013.01); *D06P 1/20* (2013.01); *D06P 1/44* (2013.01); *D06P 1/6138* (2013.01); *D06P 5/30* (2013.01)

(58) Field of Classification Search
CPC ..... C09D 11/101; C09D 11/005; C09D 11/54; C09D 11/52; B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | |
|---|---|---|
| 4,725,849 A | 2/1988 | Koike et al. |
| 5,059,248 A | 10/1991 | Signorino et al. |
| 5,486,550 A | 1/1996 | Lubas |
| 5,498,267 A | 3/1996 | Russ et al. |
| 5,591,455 A | 1/1997 | Signorino et al. |
| 5,595,592 A | 1/1997 | Signorino et al. |
| 6,001,137 A | 12/1999 | Alfekri et al. |
| 6,291,023 B1 | 9/2001 | Nigam et al. |
| 6,698,874 B2 | 3/2004 | Katsuki et al. |
| 6,906,019 B2 | 6/2005 | Nitzan et al. |
| 6,962,735 B2 | 11/2005 | Li et al. |
| 7,234,805 B2 | 6/2007 | Maekawa et al. |
| 8,088,441 B2 | 1/2012 | Smith et al. |
| 8,236,385 B2 | 8/2012 | Yahiaoui et al. |
| 2005/0117007 A1 | 6/2005 | Kosaka |
| 2006/0000034 A1 | 1/2006 | McGrath |
| 2006/0010619 A1 | 1/2006 | Hees et al. |
| 2007/0171266 A1 | 7/2007 | Kluge et al. |
| 2011/0169901 A1 | 7/2011 | Pinto et al. |

OTHER PUBLICATIONS

International Search Report and Written Opinion for Application No. PCT/US2014/16116 dated May 16, 2014 (8 pages).
European Search Report for Application No. 14751271.9 dated Jun. 21, 2016 (7 pages).

\* cited by examiner

INK COMPOSITIONS

CROSS-REFERENCE TO RELATED APPLICATIONS

This application is a national stage filing under 35 U.S.C. 371 of International Application No. PCT/US2014/016116 filed Feb. 12, 2014, and claims the benefit of U.S. Provisional Application No. 61/763,816 filed Feb. 12, 2013, which is incorporated by reference herein.

BACKGROUND

In conventional textile printing, a very large amount of water is consumed in the process. Water is involved during the fixation process of the printed dyes, and a massive amount of water is consumed to wash the fabrics of the excess dyes and auxiliary chemicals that remain in the textile after the fixation process. Until now, direct printing processes have been far from reaching 100% fixation yield for disperse dyes on polyester fabrics, which is one of the two most prominent chemistry-fabric combinations in the fashion industry.

Recent advances in digital textile printing have reduced the amount of water consumed. Digital printing requires less chemicals coming into contact with the surface of the textile during the printing process, and therefore requires less washing as a result. Nonetheless, the fixation yield is a problem that remains to be adequately addressed.

Furthermore, the low viscosity of inks used in digital textile printing requires specifically pre-treated fabrics. These pre-treated fabrics can require chemical auxiliaries be added to the fabric via a wet deposition method like foulard or spray coating processes with subsequent drying, each of which involves a significant amounts of water and energy. Ecological concerns exist regarding reduction of waste and waste water treatment, and thus a need exists to reduce the amount of water consumed in the digital printing of textiles.

Existing ink compositions cannot be efficiently used in direct inkjet printing processes without these pre-treatments, because the color fastness is not sufficient, and excessive rinsing is required to remove residual colorant. Examples of pre-treatment of textiles include pre-treatment with chemicals and surface modification, such as corona or plasma treatment. Examples of pre-treatment of textiles with chemicals for inkjet printing include those described in U.S. Pat. Nos. 8,236,385, 8,088,441, 6,962,735, 6,906,019, 6,698,874, 6,291,023, 6,001,137, 5,498,267, 4,725,849, 4,599,087, and U.S. Patent Application Pub. Nos. 2011/0169901 and 2006/0010619, each of which is incorporated herein in its entirety by reference.

A conventional direct textile printing on polyester fabric requires the following steps: 1) fabric pre-treatment to warrant sharp image quality and image vividness; 2) printing with a printing paste made of disperse water, dyestuff, dispersant, other textile printing auxiliaries and thickener to deliver the proper viscosity for printing; 3) fixation of the image by steaming, typically for 20 minutes in saturated vapor at 102° C.; 4) washing the textile to remove the unfixed dyes and chemicals from the surface of the fabric; 5) drying the textile.

Digital direct textile printing on polyester fabrics is similar to conventional direct textile printing and requires the following steps: 1) fabric pre-treatment to warrant sharp image quality and image vividness; 2) printing and image with a printing ink made of water, disperse dyestuff, dispersant, humectant, etc.; 3) fixation of the image by steaming, typically for 20 minutes in saturated vapor at 102° C.; 4) washing the textile to remove the unfixed dyes and chemicals from the surface of the fabric; 5) drying the textile.

A need exists for ink compositions suitable for use in a digital direct textile printing process for polyester fabrics, wherein the fabric need not be pre-treated, the image need not be treated with steam, the image fixation time is reduced, and the print quality is such that the textile passes the Oeko-Tex® Standard 100 without rinsing, thereby avoiding the washing and drying steps and the water and energy consumption associated therewith.

Many difficulties arise in preparing ink compositions for use in such a process. To avoid the pre-treatment of the polyester fabric, an ink composition must have physical and chemical properties such that it does not bleed when it contacts a polyester fabric which has not undergone pre-treatment. Furthermore, a pre-treatment process is typically required to incorporate the dye at a fixation yield approaching 100%, such as the pre-treatment currently used in printing for flags and banners, so the ink composition must have chemical properties such that, upon fixation, the dye preferentially diffused into the polyester fabric, and therefore leaves little to no dye in any residual ink composition carrier remaining after the fixation process. A need exists for ink compositions for use in direct inkjet printing which yield an image having a color fastness to water of at least 3 according to International Organization for Standardization test ISO 105-E01:2010 on a textile that has not been pre-treated.

Transfer printing does not have the same difficulties as direct printing, because the dye sublimes and leaves behind the entirety of its carrier on a transfer paper, thus the carrier does not impact the color fastness to water of the textile.

SUMMARY

This disclosure provides compositions comprising a disperse dye, and an aqueous carrier comprising a first polyol having at least 5 carbon atoms. The aqueous carrier may comprise a second polyol having at least 5 carbon atoms. The compositions may have a color fastness to water of at least 3 according to International Organization for Standardization test ISO 105-E01:2010 when used in direct inkjet printing on a ready-to-print polyester textile. This disclosure provides inkjet cartridges comprising these compositions. This disclosure also provides methods of direct inkjet printing on a first textile, the methods comprising: contacting the first textile with these compositions using an inkjet printer; and heating the first textile to a temperature from about 150° C. to about a melting point of the first textile for a time from about 1 second to about 1 hour to produce a printed textile.

Other aspects of the invention will become apparent by consideration of the detailed description and accompanying drawings.

DETAILED DESCRIPTION

Figure 1:
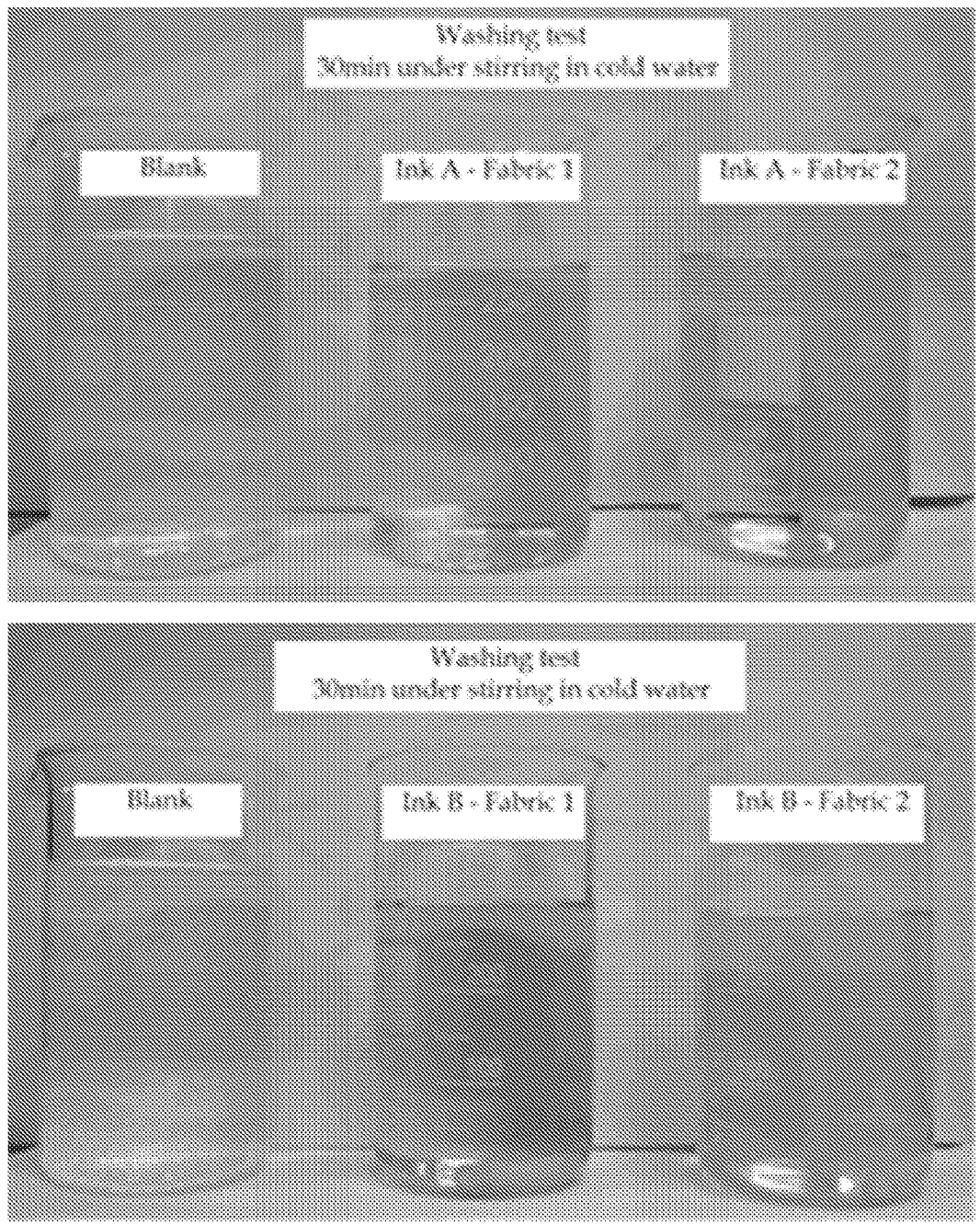
FIG. 1 shows a visual comparison of the color fastness to water of Example 1 and Comparative Example 1. The top corresponds to Example 1 and the bottom Comparative Example 1. In each picture, the left beaker is pure water, the center beaker is water that has been stirred with a ready-to-print polyester textile that has been printed with the respective ink, and the right beaker is water that has been stirred with a pre-treated polyester textile with the respective ink.

This disclosure is not limited in its application to the details of construction and the arrangement of components set forth in the following description. The disclosure may provide other embodiments and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

It should be understood that, as used herein, the term "about" is synonymous with the term "approximately." Illustratively, the use of the term "about" indicates that a value includes values slightly outside the cited values. Variation may be due to conditions such as experimental error, manufacturing tolerances, variations in equilibrium conditions, and the like. In some embodiments, the term "about" includes the cited value plus or minus 10%. In all cases, where the term "about" has been used to describe a value, it should be appreciated that this disclosure also supports the exact value.

This disclosure provides ink compositions, inkjet cartridges, and methods of making and using ink compositions, as described in detail below.

I. Ink Compositions

It has been discovered that ink compositions comprising a disperse dye and an aqueous carrier comprising a first polyol having at least 5 carbon atoms can provide improved print characteristics. Existing aqueous ink compositions lacking the polyol having at least 5 carbon atoms have been incapable of direct inkjet printing on a polyester textile with sufficient color fastness to water, without a pre-treatment, such as a chemical pre-treatment or surface modifications including corona or plasma treatment. The ink compositions disclosed herein unexpectedly achieved the desired color fastness properties when used in direct inkjet printing on a polyester textile that has not received such a pre-treatment.

Some ink compositions further may include surfactants, including anionic and non-ionic surfactants, lignosulfonates, non-lignosulfonate anionic surfactants, poly(oxyethylene)-poly(oxypropylene) (POE-POP) copolymers, non-POE-POP copolymer non-ionic surfactants, humectants, preservatives, biocides, fungicides, defoamers, pH modifiers, viscosity modifiers, agents to impart fluidity and stability to the ink, penetrants, antioxidants, ultraviolet absorbers, chelating agents, electric conductivity adjusters, viscosity modifiers, oxygen absorbers, anti-kogation agents, anti-curling agents, anti-bleed agents and buffers.

In some embodiments, the ink compositions may have a color fastness to water of at least 3 according to International Organization for Standardization test ISO 105-E01:2010 when used in direct inkjet printing on a ready-to-print polyester textile. In some embodiments, the color fastness to water may be at least 4 or at least 5.

Ready-to-print polyester textiles are polyester textiles that are directly from a typical manufacturer, which have only been simply washed to remove any oils or lubricants used in the weaving and manufacturing process. Ready-to-print polyester textiles are textiles comprising greater than 99% polyester. Ready-to-print means that no chemicals have been applied to the surface of the polyester textile in order to specifically improve print quality. Ready-to-print means that no surface modification, such as corona or plasma treatment, has been performed on the polyester textile in order to improve print quality.

In some embodiments, the ink compositions may have a color fastness to wet rubbing of at least 3 according to International Organization for Standardization test ISO 105-X12:2001 when used in direct inkjet printing on a ready-to-print polyester textile. In some embodiments, the color fastness to wet rubbing is at least 4 or at least 5. In some embodiments, the ink compositions may have a color fastness to dry rubbing of at least 4 according to International Organization for Standardization test ISO 105-X12:2001 when used in direct inkjet printing on a ready-to-print polyester textile. In some embodiments, the color fastness to dry rubbing is at least 5. In some embodiments, the ink compositions may have a color fastness to acidic perspiration or a color fastness to alkaline perspiration of at least 3 according to International Organization for Standardization test ISO 105-E04:2008 when used in direct inkjet printing on a ready-to-print polyester textile. In some embodiments, the color fastness to acidic perspiration or the color fastness to alkaline perspiration is at least 4 or at least 5.

In principle, the ink compositions may have any viscosity that allows for suitable direct inkjet printing. In some embodiments, the ink composition may have a viscosity from about 1 cP to about 50 cP at 35° C., such as a viscosity from about 2 cP to about 20 cP, or from about 5 cP to about 15 cP at about 35° C. In some embodiments, the ink composition may have a viscosity of at least about 1 cP at 35° C., at least about 2 cP, at least about 3 cP, at least about 4 cP, at least about 5 cP, at least about 6 cP, at least about 7 cP, at least about 8 cP, at least about 9 cP, at least about 10 cP, at least about 11 cP, at least about 12 cP, at least about 13 cP, at least about 14 cP, at least about 15 cP, at least about 16 cP, at least about 17 cP, at least about 18 cP, at least about 19 cP, at least about 20 cP, at least about 21 cP, at least about 22 cP, at least about 23 cP, at least about 24 cP, at least about 25 cP, at least about 26 cP, at least about 27 cP, at least about 28 cP, at least about 29 cP, at least about 30 cP, at least about 31 cP, at least about 32 cP, at least about 33 cP, at least about 34 cP, at least about 35 cP, at least about 36 cP, at least about 37 cP, at least about 38 cP, at least about 39 cP, at least about 40 cP, at least about 41 cP, at least about 42 cP, at least about 43 cP, at least about 44 cP, at least about 45 cP, at least about 46 cP, at least about 47 cP, at least about 48 cP, or at least about 49 cP. In some embodiments, the ink composition may have a viscosity of at most about 50 cP, at most about 49 cP, at most about 48 cP, at most about 47 cP, at most about 46 cP, at most about 45 cP, at most about 44 cP, at most about 43 cP, at most about 42 cP, at most about 41 cP, at most about 40 cP, at most about 39 cP, at most about 38 cP, at most about 37 cP, at most about 36 cP, at most about 35 cP, at most about 34 cP, at most about 33 cP, at most about 32 cP, at most about 31 cP, at most about 30 cP, at most about 29 cP, at most about 28 cP, at most about 27 cP, at most about 26 cP, at most about 25 cP, at most about 24 cP, at most about 23 cP, at most about 22 cP, at most about 21 cP, at most about 20 cP, at most about 19 cP, at most about 18 cP, at most about 17 cP, at most about 16 cP, at most about 15 cP, at most about 14 cP, at most about 13 cP, at most about 12 cP, at most about 11 cP, at most about 10 cP, at most about 9 cP, at most about 8 cP, at most about 7 cP, at most about 6 cP, at most about 5 cP, at most about 4 cP, at most about 3 cP, or at most about 2 cP.

In principle, the ink compositions may have any surface tension that allows for suitable direct inkjet printing. In some embodiments, the composition may have a surface tension ranging from about 22 dynes/cm to about 50 dynes/cm, from about 26 dynes/cm to about 40 dynes/cm, and from about 28 dynes/cm to about 36 dynes/cm. In some embodiments, the composition may have a surface tension of at least about 22 dynes/cm, at least about 23 dynes/cm, at least about 24 dynes/cm, at least about 25 dynes/cm, at least about 26 dynes/cm, at least about 27 dynes/cm, at least about 28 dynes/cm, at least about 29 dynes/cm, at least about 30 dynes/cm, at least about 31 dynes/cm, at least about 32 dynes/cm, at least about 33 dynes/cm, at least about 34 dynes/cm, at least about 35 dynes/cm, at least about 36 dynes/cm, at least about 37 dynes/cm, at least about 38 dynes/cm, at least about 39 dynes/cm, at least about 40 dynes/cm, at least about 41 dynes/cm, at least about 42 dynes/cm, at least about 43 dynes/cm, at least about 44 dynes/cm, at least about 45 dynes/cm, at least about 46 dynes/cm, at least about 47 dynes/cm, at least about 48 dynes/cm, or at least about 49 dynes/cm. In some embodiments, the composition may have a surface tension of at most about 50 dynes/cm, at most about 49 dynes/cm, at most about 48 dynes/cm, at most about 47 dynes/cm, at most about 46 dynes/cm, at most about 45 dynes/cm, at most about 44 dynes/cm, at most about 43 dynes/cm, at most about 42 dynes/cm, at most about 41 dynes/cm, at most about 40 dynes/cm, at most about 39 dynes/cm, at most about 38 dynes/cm, at most about 37 dynes/cm, at most about 36 dynes/cm, at most about 35 dynes/cm, at most about 34 dynes/cm, at most about 33 dynes/cm, at most about 32 dynes/cm, at most about 31 dynes/cm, at most about 30 dynes/cm, at most about 29 dynes/cm, at most about 28 dynes/cm, at most about 27 dynes/cm, at most about 26 dynes/cm, at most about 25 dynes/cm, at most about 24 dynes/cm, or at most about 23 dynes/cm.

The present disclosure also provides for pre-loaded inkjet cartridges comprising the ink compositions described herein.

Those skilled in the art will understand that the particulars of the inkjet printing process may require tailoring of properties of the ink composition to specific inkjet printers. Those skilled in the art will also understand that when using an inkjet system may comprise a plurality of inkjet compositions having matched properties. More specifically, an inkjet composition system may comprise a plurality of inkjet compositions, each inkjet composition having similar properties to one another, such as similar viscosities, surface tensions, color fastnesses, and the like.

A. Disperse Dyes

Suitable disperse dyes include any dye identified as a disperse dye by Colour Index International in the Colour Index, www.colour-index.com, which is incorporated herein by reference in its entirety. Examples of disperse dyes are given in the Colour Index, 3$^{rd}$ Edition, pages 2479 to 2742, which is incorporated herein by reference in its entirety. Each of the disperse dyes described therein is also incorporated herein by reference.

The ink compositions of the present disclosure include at least one disperse dye. Suitable disperse dyes that may be used in the inks described herein include all dyestuffs that are considered disperse. Examples include, but are not limited to, at least one of Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 160, Solvent Yellow 162, Solvent Violet 10, Solvent Black 29, Seriplas Yellow 3GL, Seriplas Orange 2RL, Seriplas Red 2BL, Seriplas Pink B, Seriplas Brown 2RTP, Seriplas Brown RL, Seriplas Blue 3GL, Seriplas Blue 6R, Seriplas Blue 5RLN, Seriplas Blue S2G, and any combination thereof. Other suitable materials are available under the trade names Macrolex (available from Lanxess) and Elbasol.

In some embodiments, ink compositions may comprise more than one disperse dye.

In some embodiments, ink compositions may comprise disperse dye in an amount ranging from about 0.1% to about 10% by weight of the composition. In some embodiments, ink compositions may comprise disperse dye in an amount of at least about 0.1% by weight of the composition, at least about 0.2%, at least about 0.3%, at least about 0.4%, at least about 0.5%, at least about 0.6%, at least about 0.7%, at least about 0.8%, at least about 0.9%, at least about 1.0%, at least about 1.1%, at least about 1.2%, at least about 1.3%, at least about 1.4%, at least about 1.5%, at least about 1.6%, at least about 1.7%, at least about 1.8%, at least about 1.9%, at least about 2.0%, at least about 2.1%, at least about 2.2%, at least about 2.3%, at least about 2.4%, at least about 2.5%, at least about 2.6%, at least about 2.7%, at least about 2.8%, at least about 2.9%, at least about 3.0%, at least about 3.1%, at least about 3.2%, at least about 3.3%, at least about 3.4%, at least about 3.5%, at least about 3.6%, at least about 3.7%, at least about 3.8%, at least about 3.9%, at least about 4.0%, at least about 4.1%, at least about 4.2%, at least about 4.3%, at least about 4.4%, at least about 4.5%, at least about 4.6%, at least about 4.7%, at least about 4.8%, at least about 4.9%, at least about 5.0%, at least about 5.1%, at least about 5.2%, at least about 5.3%, at least about 5.4%, at least about 5.5%, at least about 5.6%, at least about 5.7%, at least about 5.8%, at least about 5.9%, at least about 6.0%, at least about 6.1%, at least about 6.2%, at least about 6.3%, at least about 6.4%, at least about 6.5%, at least about 7.0%, at least about 7.5%, at least about 8.0%, at least about 8.5%, at least about 9.0%, or at least about 9.5% by weight of the composition. In some embodiments, the ink composition may comprise disperse dye in an amount of up to 10% by weight of the composition, at most about 9.5%, at most about 9.0%, at most about 8.5%, at most about 8.0%, at most about 7.5%, at most about 7.0%, at most about 6.5%, at most about 6.0%, at most about 5.9%, at most about 5.8%, at most about 5.7%, at most about 5.6%, at most about 5.5%, at most about 5.4%, at most about 5.3%, at most about 5.2%, at most about 5.1%, at most about 5.0%, at most about 4.9%, at most about 4.8%, at most about 4.7%, at most about 4.6%, at most about 4.5%, at most about 4.4%, at most about 4.3%, at most about 4.2%, at most about 4.1%, at most about 4.0%, at most about 3.9%, at most about 3.8%, at most about 3.7%, at most about 3.6%, at most about 3.5%, at most about 3.4%, at most about 3.3%, at most about 3.2%, at most about 3.1%, at most about 3.0%, at most about 2.9%, at most about 2.8%, at most about 2.7%, at most about 2.6%, at most about 2.5%, at most about 2.4%, at most about 2.3%, at most about 2.2%, at most about 2.1%, at most about 2.0%, at most about 1.9%, at most about 1.8%, at most about 1.7%, at most about 1.6%, at most about 1.5%, at most about 1.4%, at most about 1.3%, at most about 1.2%, at most about 1.1%, or at most about 1.0% by weight of the composition.

B. Aqueous Carrier

The aqueous carrier is the water-based carrier for the dye. Essentially, the aqueous carrier is everything other than the dye in the ink composition. In addition to the advantages provided by the compositions described herein, there is a marketing advantage to using water-based dyes in an ecologically friendly printing process.

Without wishing to be bound by theory, it has been hypothesized that an aqueous carrier has inherent difficulties with respect to color fastness to water with respect to various organic solvents. As all elements of the ink compositions of the present invention are dispersed within the aqueous carrier, all elements are therefore at least dispersible in water under certain conditions. Accordingly, things dissolved in the ink compositions are more easily redissolved into the water which is used in the test for color fastness to water. With an organic solvent, certain components may be water-insoluble, and thus harder to detect in a test for color fastness to water. Accordingly, ink compositions having an aqueous carrier have a more difficult technical hurdle to clear, because they require incorporation of nearly 100% of the dye into the textile, in order to avoid redissolution in the test for color fastness to water.

1. Polyol

One or more polyols having at least 5 carbon atoms are added to the ink composition, to produce a color fastness to water of at least 3 according to International Organization for Standardization test ISO 105-E01:2010 when used in direct inkjet printing on a ready-to-print polyester textile. In some embodiments, the polyol may have up to 50 carbon atoms, up to 45, up to 40, up to 35, up to 30, up to 25, up to 20, up to 19, up to 18, up to 17, up to 16, up to 15, up to 14, up to 13, up to 12, up to 11, up to 10, up to 9, up to 8, or up to 7 carbon atoms.

In some embodiments, the polyol may be selected from the group consisting of sorbitol, xylitol, mannitol, arabitol, ribitol and dulcitol.

In some embodiments, the ink composition may comprise two or more polyols. For example, the ink composition may comprise sorbitol and xylitol.

In some embodiments, the ink composition may comprise a total amount of polyol having at least 5 carbon atoms from about 6% to about 30% by weight of the composition. In some embodiments, the ink composition may comprise a total amount of polyol having at least 5 carbon atoms of at least about 6% by weight of the composition, at least about 7%, at least about 8%, at least about 9%, at least about 10%, at least about 11%, at least about 12%, or at least about 13% by weight of the composition. In some embodiments the ink composition may comprise a total amount of polyol having at least 5 carbon atoms of up to 30% by weight of the composition, up to 29%, up to 28%, up to 27%, up to 26%, up to 25%, up to 24%, up to 23%, up to 22%, up to 21%, up to 20%, up to 19%, up to 18%, up to 17%, up to 16%, up to 15%, or up to 14% by weight of the composition.

In some embodiments, the ink composition may comprise a first, second, third or nth polyol having at least 5 carbon atoms in an amount from about 1% to about 25% by weight of the composition. In some embodiments, the first, second, third or nth polyol having at least 5 carbon atoms may comprise at least about 1%, at least about 2%, at least about 3%, at least about 4%, at least about 5%, at least about 6%, at least about 7%, at least about 8%, at least about 9%, at least about 10%, at least about 11%, at least about 12%, or at least about 13% by weight of the composition. In some embodiments, the first, second, third or nth polyol having at least 5 carbon atoms may comprise at most about 25%, at most about 24%, at most about 23%, at most about 22%, at most about 21%, at most about 20%, at most about 19%, at most about 18%, at most about 17%, at most about 16%, at most about 15%, at most about 14%, at most about 13%, at most about 12%, at most about 11%, at most about 10%, at most about 9%, at most about 8%, at most about 7%, at most about 6%, at most about 5%, at most about 4%, at most about 3%, at most about 2% by weight of the composition.

In some embodiments, the second polyol may be different from the first polyol. In some embodiments, the third polyol may be different from both the first and second polyol. In some embodiments, the nth polyol may be different from the first, second, and third through (n−1)th polyol.

In some embodiments, the first polyol may be sorbitol and the second polyol may be xylitol. It has been observed that the use of sorbitol and xylitol together, as opposed to each component individually, may provide a synergistic effect which provides improved properties such as those described herein.

Without wishing to be bound by theory, it has been hypothesized that the addition of a polyol or mixture of polyols having at least 5 carbon atoms provides physical and chemical conditions such that a disperse dye preferentially diffuses into a polyester fabric upon fixation in a direct inkjet printing process. In the absence of such a polyol or mixture of polyols in the proper amounts, some dyestuff may get trapped in surface residues, which may require washing and drying to achieve the color fastness to water required to achieve the Oeko-Tex® Standard 100.

2. Surfactants

One or more surfactants may be added to the ink compositions, for example, to reduce the surface tension. A surfactant may be any suitable surfactant, such as an anionic surfactant, a non-ionic surfactant, a cationic surfactant, an amphoteric surfactant, a zwitterionic surfactant, or any combination thereof.

Suitable anionic surfactants may include, but are not limited to, alkyl sulfates, alkyl ether sulfates, alkyl aryl sulfonates (e.g., a linear alkyl benzene sulfonate), alpha-olefin sulfonates, alkali metal or ammonium salts of alkyl sulfates, alkali metal or ammonium salts of alkyl ether sulfates, alkyl phosphates, silicone phosphates, alkyl glyceryl sulfonates, alkyl sulfosuccinates, alkyl taurates, acyl taurates, alkyl sarcosinates, acyl sarcosinates, sulfoacetates, alkyl phosphate esters, mono alkyl succinates, monoalkyl maleates, sulfoacetates, acyl isethionates, alkyl carboxylates, phosphate esters, sulfosuccinates, lignosulfonates, and combinations thereof. Some non-limiting examples of anionic surfactants include sodium lauryl sulfate, sodium lauryl ether sulfate, ammonium lauryl sulfosuccinate, ammonium lauryl sulfate, ammonium lauryl ether sulfate, sodium dodecylbenzene sulfonate, triethanolamine dodecylbenzene sulfonate, sodium cocoyl isethionate, sodium lauroyl isethionate, sodium N-lauryl sarcosinate, and combinations thereof.

Suitable non-ionic surfactants may include, but are not limited to, mono- and di-alkanolamides, amine oxides, alkyl polyglucosides, ethoxylated silicones, ethoxylated alcohols, ethoxylated carboxylic acids, ethoxylated fatty acids, ethoxylated amines, ethoxylated amides, ethoxylated alkylolamides, ethoxylated alkylphenols, ethoxylated glyceryl esters, ethoxylated sorbitan esters, ethoxylated phosphate esters, block copolymers (e.g., polyethylene glycol/polypropylene glycol block copolymers), glycol stearate, glyceryl stearate, and combinations thereof.

Suitable cationic surfactants may include, but are not limited to, alkyl ammonium salts, polymeric ammonium salts, alkyl pyridinium salts, aryl ammonium salts, alkyl aryl ammonium salts, silicone quaternary ammonium compounds, and combinations thereof. Some non-limiting examples of cationic surfactants include behenyl trimonium chloride, stearalkonium chloride, distearalkonium chloride, chlorohexidine digluconate, polyhexamethylene biguanide (PHMB), cetyl pyridinium chloride, benzammonium chloride, benzalkonium chloride, and combinations thereof.

Suitable amphoteric surfactants may include, but are not limited to, betaines, alkylamido betaines, sulfobetaines, N-alkyl betaines, sultaines, amphoacetates, amophodiacetates, imidazoline carboxylates, sarcosinates, acylamphoglycinates, such as cocamphocarboxyglycinates and acylamphopropionates, and combinations thereof. Some non-limiting examples of amphoteric surfactants include cocamidopropyl betaine, lauramidopropyl betaine, meadowfoam amidopropyl betaine, sodium cocoyl sarcosinate, sodium cocamphoacetate, disodium cocoamphodiacetate, ammonium cocoyl sarcosinate, sodium cocoamphopropionate, and combinations thereof.

Suitable zwitterionic surfactants may include, but are not limited to, alkyl amine oxides, silicone amine oxides, and combinations thereof. Some non-limiting examples of suitable zwitterionic surfactants include, for example, 4-[N,N-di(2-hydroxyethyl)-N-octadecylammonio]-butane-1-carboxylate, S—[S-3-hydroxypropyl-5-hexadecylsulfonio]-3-hydroxypentane-1-sulfate, 3-[P,P-diethyl-P-3,6,9-trioxatetradexopcylphosphonio]-2-hydroxypropane-1-phosphate, 3-[N,N-dipropyl-N-3-dodecoxy-2-hydroxypropylammonio]-propane-1-phosphonate, 3-(N,N-dimethyl-N-hexadecylammonio)propane-1-sulfonate, 3-(N,N-dimethyl-N-hexadecylammonio)-2-hydroxypropane-1-sulfonate, 4-[N,N-di(2-hydroxyethyl)-N-(2-hydroxydodecyl)ammonio]-butane-1-carboxylate, 3-[S-ethyl-S-(3-dodecoxy-2-hydroxypropyl)sulfonio]-propane-1-phosphate-, 3-[P,P-dimethyl-P-dodecylphosphonio]-propane-1-phosphonate, 5-[N,N-di(3-hydroxypropyl)-N-hexadecylammonio]-2-hydroxypentane-1-sulfate, and combinations thereof.

Surfactants are commercially available under various well-known trade names, such as the PLURONIC® series (BASF Corporation, Parsippany, N.J.), the TETRONIC® series (BASF Corporation, Parsippany, N.J.), the ARQUAD® series (Akzo Chemical Inc., Chicago, Ill.), the TRITON® series (Dow Chemical, Midland, Mich.), the SURFONIC® series (Texaco Chemical Company, Houston, Tex.), the ETHOQUAD® series (Akzo Chemical Inc., Chicago, Ill.), the ARMEEN® series (Akzo Chemical Inc., Chicago, Ill.), the ICONOL® series (BASF Corporation, Parsippany, N.J.), the SURFYNOL® series (Air Products and Chemicals, Inc. Allentown, Pa.), the ETHOMEEN® series (Akzo Chemical Inc., Chicago, Ill.), the DISPERBYK® series (BYK Additives), Vanisperse CB (Borregaard Lignotech), Jeffsperse® (Huntsman Chemical), Edaplan® (Munzing, Chemie GmbH, Heilbronn, Germany), Tanemul® (Tanatex Chemicals), the Tego® Dispers series (Evonik Tego Chemie GmbH, Essen, Germany), Diwatex® series (Borregard Lignotech USA Inc.), the Setamol® series (ChemiteX), the Tamol® series (BASF), the Orotan™ series (Dow Chemical, Midland, Mich.), the Galoryl® series (ArrMaz, Mulberry, Fla.), the Oparyl® series (Bozzetto Inc., Greensboro, N.C.), the Zephrym® series (Croda Inc., Edison, N.J.), and the REAX® series (MeadWestvaco), among others.

Surfactants may be used alone or in combination. The amount of surfactant in the ink composition may range from about 0.1% to about 10%, from about 0.1% to about 8% or from about 0.3% to about 5% by weight of the composition. In some embodiments, the ink composition may comprise surfactant in an amount of at least about 0.1% by weight of the composition, at least about 0.2%, at least about 0.3%, at least about 0.4%, at least about 0.5%, at least about 0.6%, at least about 0.7%, at least about 0.8%, at least about 0.9%, at least about 1.0%, at least about 1.1%, at least about 1.2%, at least about 1.3%, at least about 1.4%, at least about 1.5%, at least about 1.6%, at least about 1.7%, at least about 1.8%, at least about 1.9%, at least about 2.0%, at least about 2.1%, at least about 2.2%, at least about 2.3%, at least about 2.4%, at least about 2.5%, at least about 2.6%, at least about 2.7%, at least about 2.8%, at least about 2.9%, at least about 3%, at least about 4%, or at least about 5% by weight of the composition. In some embodiments, the ink composition may comprise surfactant in an amount of at most about 10% by weight of the composition, at most about 9.5%, at most about 9.0%, at most about 8.5%, at most about 8.0%, at most about 7.5%, at most about 7.0%, at most about 6.5%, at most about 6.0%, at most about 5.5%, at most about 5.0%, at most about 4.9%, at most about 4.8%, at most about 4.7%, at most about 4.6%, at most about 4.5%, at most about 4.4%, at most about 4.3%, at most about 4.2%, at most about 4.1%, at most about 4.0%, at most about 3.9%, at most about 3.8%, at most about 3.7%, at most about 3.6%, at most about 3.5%, at most about 3.4%, at most about 3.3%, at most about 3.2%, at most about 3.1%, or at most about 3.0% by weight of the composition.

The amount of anionic surfactant in the ink composition may range from about 0.1% to about 6% by weight of the composition. In some embodiments, the ink composition may comprise anionic surfactant in an amount of at least about 0.1% by weight of the composition, at least about 0.2%, at least about 0.3%, at least about 0.4%, at least about 0.5%, at least about 0.6%, at least about 0.7%, at least about 0.8%, at least about 0.9%, at least about 1.0%, at least about 1.1%, at least about 1.2%, at least about 1.3%, at least about 1.4%, at least about 1.5%, at least about 1.6%, at least about 1.7%, at least about 1.8%, at least about 1.9%, at least about 2.0%, at least about 2.1%, at least about 2.2%, at least about 2.3%, at least about 2.4%, at least about 2.5%, at least about 2.6%, at least about 2.7%, at least about 2.8%, at least about 2.9%, at least about 3%, at least about 4%, or at least about 5% by weight of the composition. In some embodiments, the ink composition may comprise anionic surfactant in an amount of at most about 6.0% by weight of the composition, at most about 5.5%, at most about 5.0%, at most about 4.9%, at most about 4.8%, at most about 4.7%, at most about 4.6%, at most about 4.5%, at most about 4.4%, at most about 4.3%, at most about 4.2%, at most about 4.1%, at most about 4.0%, at most about 3.9%, at most about 3.8%, at most about 3.7%, at most about 3.6%, at most about 3.5%, at most about 3.4%, at most about 3.3%, at most about 3.2%, at most about 3.1%, at most about 3.0%, at most about 2.9%, at most about 2.8%, at most about 2.7%, at most about 2.6%, at most about 2.5%, at most about 2.4%, at most about 2.3%, at most about 2.2%, at most about 2.1%, or at most about 2.0% by weight of the composition.

Suitable non-lignosulfonate anionic surfactants may include sodium dodecyl sulfate, Setamol® BL, Tamol® NN 9104, and Orotan™ SM, among others.

Without wishing to be bound by theory, it has been hypothesized that the amount of lignosulfonate must be limited in direct inkjet printing applications, because the colored lignosulfonate will show up in tests for color fastness to water. Accordingly, the amount of lignosulfonate must be limited, whereas in transfer printing there is no such limitation.

The amount of lignosulfonate in the composition may range from 0% to about 3% by weight of the composition. Suitable lignosulfonates include REAX® 85A, REAX® 907, Vanisperse CB, Diwatex® XP-9, REAX® WSD, and REAX® 105M, among others.

The amount of non-ionic surfactant in the ink composition may range from 0% to about 4% by weight of the composition. In some embodiments, the ink composition may comprise non-ionic surfactant in an amount of at least 0%, at least about 0.1% by weight of the composition, at least about 0.2%, at least about 0.3%, at least about 0.4%, at least about 0.5%, at least about 0.6%, at least about 0.7%, at least about 0.8%, at least about 0.9%, at least about 1.0%, at least about 1.1%, at least about 1.2%, at least about 1.3%, at least about 1.4%, at least about 1.5%, at least about 1.6%, at least about 1.7%, at least about 1.8%, at least about 1.9%, at least about 2.0%, at least about 2.1%, at least about 2.2%, at least about 2.3%, at least about 2.4%, at least about 2.5%, at least about 2.6%, at least about 2.7%, at least about 2.8%, at least about 2.9%, or at least about 3% by weight of the composition. In some embodiments, the ink composition may comprise non-ionic surfactant in an amount of at most about 4.0%, at most about 3.9%, at most about 3.8%, at most about 3.7%, at most about 3.6%, at most about 3.5%, at most about 3.4%, at most about 3.3%, at most about 3.2%, at most about 3.1%, at most about 3.0%, at most about 2.9%, at most about 2.8%, at most about 2.7%, at most about 2.6%, at most about 2.5%, at most about 2.4%, at most about 2.3%, at most about 2.2%, at most about 2.1%, at most about 2.0%, at most about 1.9%, at most about 1.8%, at most about 1.7%, at most about 1.6%, at most about 1.5%, at most about 1.4%, at most about 1.3%, at most about 1.2%, at most about 1.1%, at most about 1.0%, at most about 0.9%, at most about 0.8%, at most about 0.7%, at most about 0.6%, or at most about 0.5% by weight of the composition.

The amount of POE-POP copolymers in the composition may range from 0% to about 4% by weight of the composition. In some embodiments, the ink composition may comprise POE-POP copolymers in an amount of at least 0%, at least about 0.1% by weight of the composition, at least about 0.2%, at least about 0.3%, at least about 0.4%, at least about 0.5%, at least about 0.6%, at least about 0.7%, at least about 0.8%, at least about 0.9%, at least about 1.0%, at least about 1.1%, at least about 1.2%, at least about 1.3%, at least about 1.4%, at least about 1.5%, at least about 1.6%, at least about 1.7%, at least about 1.8%, at least about 1.9%, at least about 2.0%, at least about 2.1%, at least about 2.2%, at least about 2.3%, at least about 2.4%, at least about 2.5%, at least about 2.6%, at least about 2.7%, at least about 2.8%, at least about 2.9%, or at least about 3% by weight of the composition. In some embodiments, the ink composition may comprise POE-POP copolymers in an amount of at most about 4.0%, at most about 3.9%, at most about 3.8%, at most about 3.7%, at most about 3.6%, at most about 3.5%, at most about 3.4%, at most about 3.3%, at most about 3.2%, at most about 3.1%, at most about 3.0%, at most about 2.9%, at most about 2.8%, at most about 2.7%, at most about 2.6%, at most about 2.5%, at most about 2.4%, at most about 2.3%, at most about 2.2%, at most about 2.1%, at most about 2.0%, at most about 1.9%, at most about 1.8%, at most about 1.7%, at most about 1.6%, at most about 1.5%, at most about 1.4%, at most about 1.3%, at most about 1.2%, at most about 1.1%, at most about 1.0%, at most about 0.9%, at most about 0.8%, at most about 0.7%, at most about 0.6%, or at most about 0.5% by weight of the composition.

Suitable POE-POP copolymers include DISPERBYK® 190, DISPERBYK® 191, Jeffsperse® X-3204, Edaplan® 482, Tanemul® 373, Tego® 740 W, and Tego® 750 W, among others.

3. Humectants

One or more humectants may be added to the ink compositions, such as to form an ink composition that is less likely to clog an inkjet nozzle despite drying that occurs during periods of latency. Humectants may be selected from materials having high hygroscopicity and water-solubility. Examples of humectants include, but are not limited to, glycerol, ethylene glycol, diethylene glycol, triethylene glycol, 2-pyrrolidone, urea, 1,3-dimethylimidazolidinone, monopropyléne glycol, hexylene glycol, N-ethylacetamide, 3-amino-1,2-propanediol, ethylene carbonate, and 1,5 pentanediol.

There are no particular limitations on the amount of the humectant used, but in general, the amount of humectant (by weight) in the ink composition may range from about 15% to about 45%, particularly from about 20% to about 40%, and more particularly from about 20% to about 30%. In some embodiments, the ink composition may comprise humectant in an amount of at least about 15% by weight of the composition, at least about 16%, at least about 17%, at least about 18%, at least about 19%, at least about 20%, at least about 21%, at least about 22%, at least about 23%, at least about 24%, at least about 25%, at least about 26%, at least about 27%, at least about 28%, at least about 29%, or at least about 30% by weight of the composition. In some embodiments, the ink composition may comprise humectant in an amount of at most about 45% by weight of the composition, at most about 44%, at most about 43%, at most about 42%, at most about 41%, at most about 40%, at most about 39%, at most about 38%, at most about 37%, at most about 36%, at most about 35%, at most about 34%, at most about 33%, at most about 32%, at most about 31%, at most about 30%, at most about 29%, at most about 28%, at most about 27%, at most about 26%, at most about 25%, at most about 24%, at most about 23%, at most about 22%, at most about 21%, or at most about 20% by weight of the composition.

4. Additional Components

Preservatives, such as biocides and fungicides, may also be added to the ink composition. Examples of suitable preservatives include sodium benzoate, pentachlorophenol sodium, 2-pyridinethiol-1-oxide sodium, sodium sorbate, sodium dehydroacetate, benzisothiazolinone, 1,2-dibenzothiazolin-3-one, CTAC, bronoprol, methylisothiazolinone, chloromethylisothiazolinone, octylisothiazolone, and mixtures thereof. Suitable biocides may also be mixtures of isothiazolinones. Commercially available biocides/fungicides also include UCARCIDE® 250 (available from Dow Chemical, Midland, Mich.); Proxel® CRL, Proxel® BDN, Proxel® GXL, Proxel® XL-2, Proxel® TN (available from Arch Chemicals, Smyrna, Ga.); Dowicil® (Dow Chemical, Midland, Mich.); Nuosept® (International Specialty Products, Wayne, N.J.); Troysans® (Troy Chemical Corp., Newark, N.J.); ACTICIDE®¬ (Thor Group Limited, Canterbury, UK); PREVENTOL® (LANXESS Deutschland GmbH, Leverkusen, Germany); and Rocima™ (Rohm and Haas). The preservatives may be used alone or in combination. The amount of preservatives in the ink composition may range from 0% to about 2.0%, from about 0.025% to about 1.0%, from about 0.05% to about 0.5%, or from about 0.1% to about 0.3% by weight of the composition.

One or more defoamers may also be added to the ink composition, for example, to preventing foaming of the composition under conditions of high temperature and/or high shear forces. Suitable defoamers include but are not limited to siloxane-based or mineral-oil based defoamers, or suitable solvents such as glycol ethers and alcohols. Commercially available defoamers also include Tego® Foamex series of defoamers (e.g., Tego® Foamex 830, available from Evonik Tego Chemie GmbH, Essen, Germany), the Surfynol® series of defoamers (available from Air Products, Allentown, Pa.), the AGITAN® series of defoamers (available from Münzig Chemie, Germany) among others. The amount of defoamer in the ink composition may range from 0% to about 5%, from about 0.1% to about 2.5%, or from about 0.25% to about 1% by weight of the composition.

Polymers may be added to the ink composition to improve the water-fastness, rub and lightfastness of the images on print media. Suitable polymers may include, but are not limited to, polyvinyl alcohol, polyester, polyurethane, polyurethane-acrylic, polyestermelamine, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl-naphthalene-acrylic acid copolymers, vinyl naphthalene-maleic acid copolymers and salts thereof. The amount of polymer in the ink composition may range from 0% to about 10%, from about 0.1% to about 6%, or from about 0.2% to about 4% by weight of the composition.

Ink compositions may be buffered to a desired pH using any number of pH modifiers. Suitable pH modifiers may include alkali hydroxides, alkali carbonates and bicarbonates, triethylamine, dimethylethanolamine, triethanolamine, mineral acids, hydrochloric acid, and sulfuric acid. A pH modifier may be used alone or in combination. The amount of pH modifier in the ink composition may range from 0% to about 3.0%, from about 0.1% to about 2.0%, from about 0.2% to about 2.5% or from about 0.5% to about 1.5% by weight of the composition.

The ink composition may contain one or more viscosity modifiers. Viscosity modifiers may include rosin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, HEUR (hydrophobic ethoxylated urethanes), HASE (hydrophobically modified alkali swellable emulsions), ASE (alkali swellable emulsions), and combinations thereof. The amount of viscosity modifier in the ink composition may range from 0.1% to about 10%, from about 0.5% to about 8%, from about 1% to about 7% or from about 2% to about 5% by weight of the composition.

Agents may also be added to impart fluidity and stability to the ink. Examples of such agents may be found in U.S. Pat. No. 5,059,248, U.S. Pat. No. 5,591,455 and U.S. Pat. No. 5,595,592, each of which is hereby incorporated by reference. Examples include, but are not limited to, linear aliphatic substituted glycine compounds and salts thereof. As used herein, the term "linear aliphatic substituted glycine" designates glycine compounds in which the amino group of glycine has been substituted with linear aliphatic groups. Illustrative of agents of this type which may be used are ethylenediaminetetraacetic acid (EDTA), nitrilotriacetic acid (NTA), diethylenetriamine pentaacetic acid (DTPA), hydroxyethylene diamine triacetic acid, dihydroxyethyl glycine, iminodiacetic acid and ethanol diglycine, and the alkali metal (e.g., sodium), alkaline earth metal (e.g., calcium) and ammonium salts thereof. Other linear aliphatic substituted glycine compounds and salts thereof known to those skilled in the art may also be used. In some embodiments, the aforementioned salts of ethylenediaminetetraacetic acid are used because of their availability, cost effectiveness and nontoxicity. In some embodiments, these agents may constitute approximately 0.1% to about 5.0% by weight of the composition.

Penetrants may be added to reduce bleed, improve wetting of the print media, and otherwise improve overall performance of the print image. Examples of penetrants may include, but are not limited to, alkyl alcohols having 1 to 4 carbon atoms, such as ethanol, glycol ethers, such as ethylene glycol monomethyl ether, diols such as 1,2-alkyl diols, formamide, acetamide, dimethylsulfoxide, sorbitol and sulfolane. The penetrants may be used alone or in combination. The amount of penetrant in the ink composition may range from 1% to about 60%, from about 2% to about 40%, from about 5% to about 20%, or from about 10% to about 15% by weight of the composition.

Other components which may be incorporated into the compositions may also include antioxidants, ultraviolet absorbers, chelating agents, electric conductivity adjusters, viscosity modifiers, oxygen absorbers, anti-kogation agents, anti-curling agents, anti-bleed agents and buffers. Other components may be incorporated into the ink compositions to impart any number of desired properties, such as might be needed to adapt the ink to the requirements of a particular printer or to provide a balance of light stability, smear resistance, viscosity, surface tension, coating penetration, optical density, color depth, adhesion, or crust resistance.

5. Solvents

The ink compositions may comprise water or water in combination with one or more water-soluble organic solvents. The amount of water in the ink composition may range from about 20% to about 70% by weight of the composition. Water-soluble organic solvents may include alcohols, polyhydric alcohols such as ethylene glycol, glycerine, PEG, ketones and ketone alcohols such as acetone and diacetone alcohol, ethers such as tetrahydrofuran and dioxane, lower alkyl ethers of polyhydric alcohols, such as ethylene glycol monomethyl (or monoethyl) ether, nitrogen-containing solvents such as pyrrolidone or N-methyl-2-pyrrolidone, sulfur-containing solvents such as thiodiethanol, sugars and derivatives thereof such as glucose, an oxyethylene adduct of glycerin; and an oxyethylene adduct of diglycerin. The water-soluble organic solvents may be used alone or in combination. If a mixture of water and a water-soluble organic solvent is used, the amount of water-soluble organic solvent in the ink composition may be at least about 5%, at least about 15%, or at least about 25%. Furthermore, the amount of water-soluble organic solvent in the ink composition may be at most about 50%, at most about 40%, or at most about 25%.

II. Methods of Making Compositions

Compositions described herein may be prepared by any suitable method known to one of skill in the art. In some embodiments, the method comprises milling the disperse dye. This milling step may occur either during or after being combined with some or all of the components of the aqueous carrier. Moreover, the polyol having at least 5 carbon atoms may be combined with the other components of the ink composition either before or after the milling step.

In some embodiments, the method may comprise milling the disperse dye with a portion of the components of the aqueous carrier. In some embodiments, the portion of the aqueous carrier does not comprise the polyol having at least 5 carbon atoms. In some embodiments, the mixture of the disperse dye with the portion of the components of the aqueous carrier is let down to the final ink composition with the remainder of the components of the aqueous carrier.

III. Direct Inkjet Printing

Direct inkjet printing is a printing process wherein a digital image is printed onto a textile using an inkjet printhead, followed by a fixation step. In some embodiments, fixation may be achieved by applying dry heat to the image printed onto the textile.

In some embodiments, direct inkjet printing may not require water. In some embodiments, direct inkjet printing may not involve a rinse step.

In some embodiments, direct inkjet printing comprises contacting a textile with an ink composition described herein using an inkjet printer, and heating the textile to a temperature from about 150° C. to about a melting point of the textile for a time from about 1 second to about 1 hour to produce a printed textile.

In some embodiments, the temperature may be at least about 150° C., at least about 155° C., at least about 160° C., at least about 165° C., at least about 170° C., at least about 175° C., at least about 180° C., at least about 185° C., at least about 190° C., at least about 195° C., at least about 200° C., at least about 205° C., at least about 210° C., or at least about 215° C. In some embodiments, the temperature may be at most about 300° C., at most about 290° C., at most about 280° C., at most about 270° C., at most about 260° C., at most about 250° C., at most about 240° C., at most about 230° C., at most about 220° C., at most about 215° C., at most about 210° C., at most about 205° C., at most about 200° C., at most about 195° C., at most about 190° C., or at most about 185° C.

In some embodiments, the time is at least about 1 second, at least about 2 seconds, at least about 3 seconds, at least about 4 seconds, at least about 5 seconds, at least about 6 seconds, at least about 7 seconds, at least about 8 seconds, at least about 9 seconds, at least about 10 seconds, at least about 15 seconds, at least about 20 seconds, at least about 25 seconds, at least about 30 seconds, at least about 35 seconds, at least about 40 seconds, at least about 45 seconds, at least about 50 seconds, at least about 55 seconds, at least about 1 minute, at least about 2 minutes, at least about 3 minutes, at least about 4 minutes, at least about 5 minutes, at least about 10 minutes, at least about 15 minutes, at least about 20 minutes, at least about 25 minutes, at least about 30 minutes, or at least about 45 minutes. In some embodiments, the time is at most about 1 hour, at most about 45 minutes, at most about 30 minutes, at most about 25 minutes, at most about 20 minutes, at most about 15 minutes, at most about 10 minutes, at most about 9 minutes, at most about 8 minutes, at most about 7 minutes, at most about 6 minutes, at most about 5 minutes, at most about 4 minutes, at most about 200 seconds, at most about 195 seconds, at most about 190 seconds, at most about 185 seconds, at most about 180 seconds, at most about 175 seconds, at most about 170 seconds, at most about 165 seconds, at most about 160 seconds, at most about 155 seconds, at most about 150 seconds, at most about 145 seconds, at most about 140 seconds, at most about 135 seconds, at most about 130 seconds, at most about 125 seconds, at most about 120 seconds, at most about 115 seconds, at most about 110 seconds, at most about 105 seconds, at most about 100 seconds, at most about 95 seconds, at most about 90 seconds, at most about 85 seconds, at most about 80 seconds, at most about 75 seconds, at most about 70 seconds, at most about 65 seconds, at most about 60 seconds, at most about 55 seconds, at most about 50 seconds, at most about 45 seconds, at most about 40 seconds, at most about 35 seconds, at most about 30 seconds, at most about 25 seconds, at most about 20 seconds, or at most about 15 seconds.

An example of a suitable inkjet printer for use with the present invention is a Nassenger Pro 60 (available from Konica Minolta), although any suitable inkjet printer may be used.

The ink compositions described herein generally should retain contact with the ready-to-use polyester textile for a sufficient amount of time to ensure fixation has occurred. In some embodiments, fixation may occur after the composition has been in contact with a ready-to-print polyester textile for at least about 10 seconds, at least about 15 seconds, at least about 20 seconds, at least about 25 seconds, at least about 30 seconds, at least about 35 seconds, at least about 40 seconds, at least about 45 seconds, at least about 50 seconds, at least about 55 seconds, or at least about 60 seconds after delivery via an inkjet printer used in direct inkjet printing.

A decap time is a time during which a printhead can stay unparked at the capping station while retaining the ability to print without delay and without any missing or clogged nozzles. In some embodiments, the ink composition may comprise a decap time of at least about 30 seconds when used in direct inkjet printing, at least about 45 seconds, at least about 60 seconds, at least about 5 minutes, at least about 15 minutes, at least about 30 minutes, at least about 45 minutes, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, at least about 12 hours, at least about 13 hours, at least about 14 hours, at least about 15 hours, at least about 16 hours, at least about 17 hours, at least about 18 hours, at least about 19 hours, at least about 20 hours, at least about 21 hours, at least about 22 hours, at least about 23 hours, or at least about 24 hours.

The decap time may be measured with inkjet printing settings that a person having ordinary skill in the art would recognize as suitable for use in inkjet printing. In some embodiments, the decap time may be measured with a drop size that is typically used for inkjet printing, such as a drop size of at least about 1 pL, at least about 5 pL, at least about 10 pL, at least about 12 pL, or at least about 15 pL. In some embodiments, the decap time may be measured at a frequency that is typically used for inkjet printing, such as a frequency of at least about 1 kHz, at least about 10 kHz, or at least about 20 kHz. In some embodiments, the decap time may be measured at atmospheric conditions of a temperature between about 20° C. and about 22° C. and a relative humidity of about 40%.

EXAMPLES

Exemplary embodiments of the present invention are provided in the following examples. The following examples are presented to illustrate the present invention and to assist one of ordinary skill in making and using the same. The examples are not intended in any way to otherwise limit the scope of the invention.

Example and comparative example compositions were prepared letting down a dispersion prepared by combining the dye with a portion of the aqueous carrier, and milling in a bead mill using 1 mm ceramic beads, until the mean particle size of the dispersion measured by photon correlation spectroscopy was 130 nm.

All values of components in the examples and comparative examples are percent by weight of the composition.

Example 1. Ink Composition

The formulations of Table 1 were prepared by inkjet ink preparation techniques known to one of skill in the art, as described above.

TABLE 1

| Component | Example 1 (Ink A) | Comparative Example 1 (Ink B) |
|---|---|---|
| Dye Disperse Red 60 | 4.95 | 4.95 |
| Sorbitol | 8 | 0 |
| Xylitol | 5 | 0 |
| Glycerol | 22 | 25 |
| 50:50 mixture of propoxylated glycerol and fructose | 2.2 | 2.2 |
| Disperbyk ® 190 | 1 | 1 |
| Pluronic ® PE10500 | 0.87 | 2.87 |
| Galoryl ® DT50 | 0.76 | 0.76 |
| Lignosulfonate | 0.70 | 2.7 |
| pH adjuster | 0.20 | 0.20 |
| Defoamer | 0.11 | 0.11 |
| Biocide | 0.31 | 0.31 |
| Water | Balance | Balance |

Figure 2:
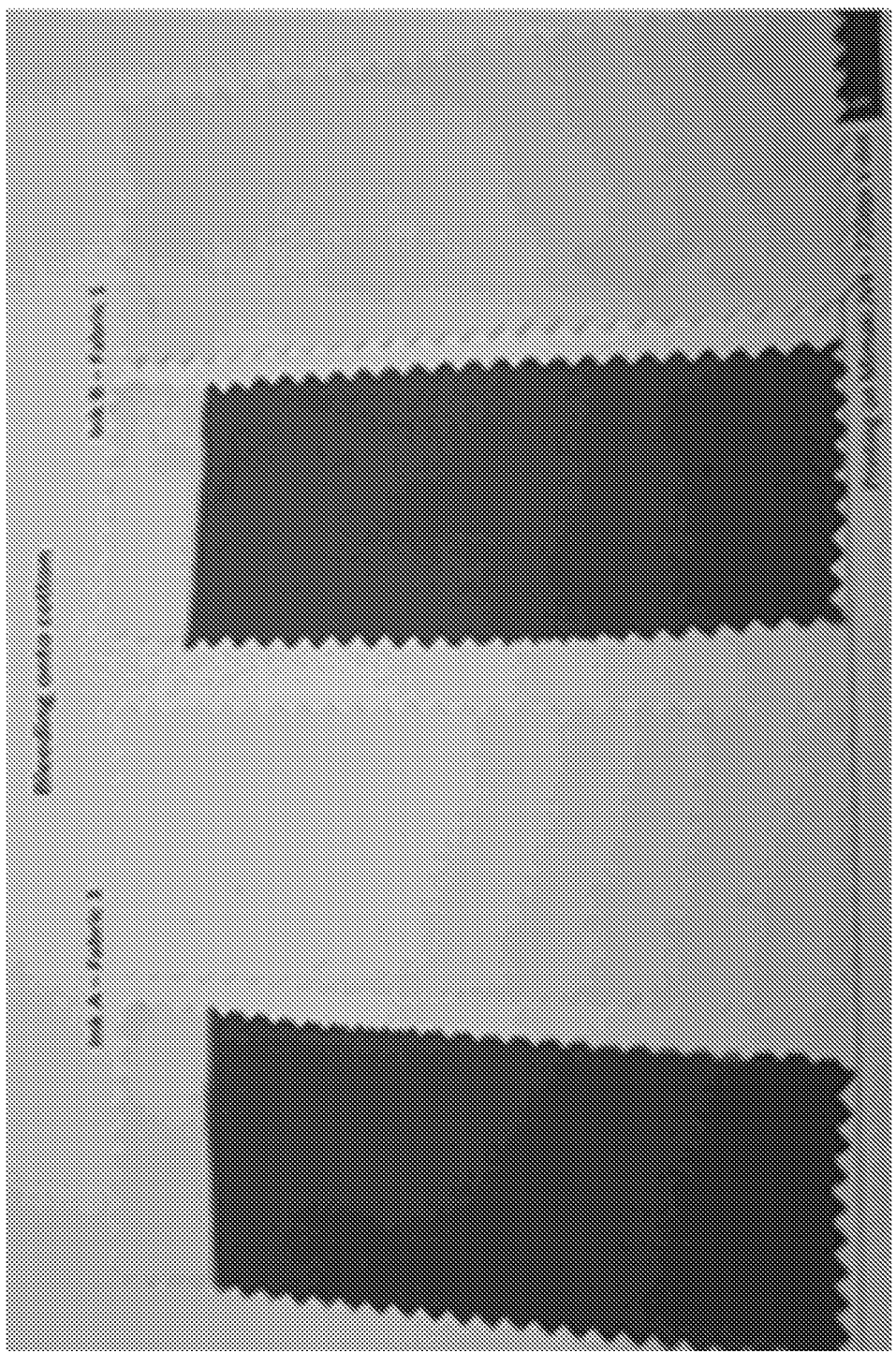
FIG. 2 shows a visual comparison of the color fastness to water as shown by bleeding into cotton for Example 1 (left) and Comparative Example 1 (right).
Figure 3:
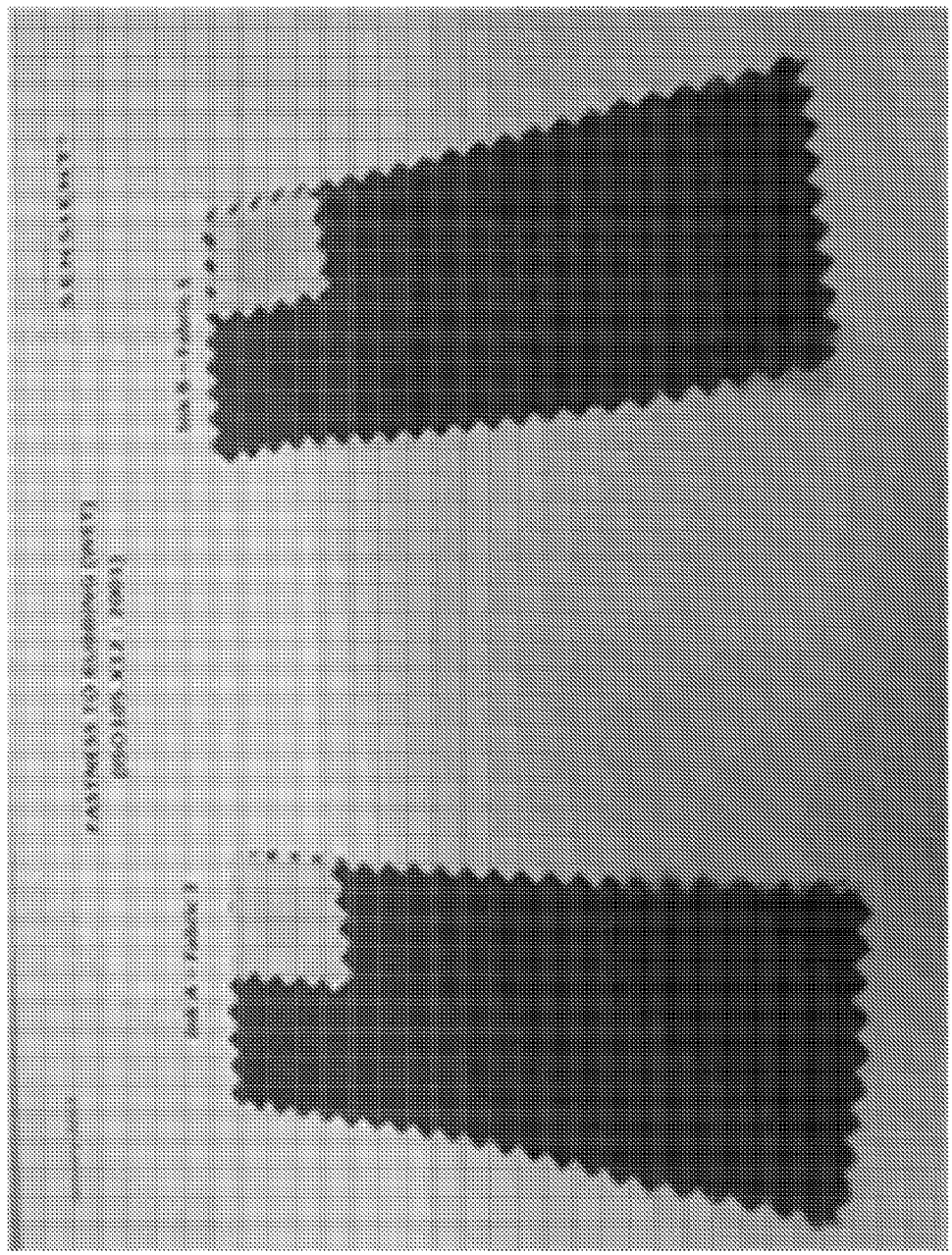
FIG. 3 shows a visual comparison of the color fastness to rubbing (wet) of Example 1 (left) and Comparative Example 1 (right).

Example 1 (Ink A) and Comparative Example 1 (Ink B) were each applied via direct inkjet printing to one ready-to-print polyester textile (Fabric 1) and one pre-treated polyester textile (Fabric 2). The resulting textiles were stirred with cold water for 30 minutes. FIG. 1 shows the results. Example 1 shows excellent color fastness to water for both textiles, whereas Comparative Example 1 requires pre-treatment in order to achieve sufficient color fastness to water. The textiles resulting from printing on the ready-to-print polyester fabric were also placed on a white piece of cotton fabric and sprayed with water. FIG. 2 shows the results. Example 1 again shows excellent color fastness to water, whereas Comparative Example 1 fails to have sufficient color fastness to water. The textiles resulting from printing on the ready-to-print polyester fabric were rubbed 10 times with a white piece of cotton soaked with water. FIG. 3 shows the results. Example 1 shows excellent color fastness to rubbing (wet), wherein Comparative Example 1 fails to have sufficient color fastness to rubbing (wet).

Examples 2-9. Ink Compositions

Examples 2-9 were prepared by inkjet ink preparation techniques known to one of skill in the art, as described above. Examples 2-9 were printed onto ready-to-print polyester fabric using a Nassenger Pro 60 (available from Konica Minolta) with 540×720 dpi and dry heat fixation at 210° C. for 30 seconds. All examples provided a color fastness to rubbing (wet) of at least 3 and color fastness to rubbing (dry) of at least 4 according to International Organization for Standardization test ISO 105-X12:2001.

TABLE 2

| Component | Example 2 |
|---|---|
| Dye Disperse Yellow 54 | 2.8 |
| Sorbitol | 7.0 |
| Xylitol | 5.0 |
| Glycerol | 31.0 |
| Disperbyk ® 190 | 3.3 |
| Galoryl ® DT50 | 0.09 |
| pH adjuster | 0.20 |
| Biocide | 0.53 |
| Defoamer | 0.04 |
| Water | Balance |

TABLE 3

| Component | Example 3 |
|---|---|
| Dye Disperse Orange 25 | 1.9 |
| Sorbitol | 8.4 |
| Xylitol | 6.0 |
| Glycerol | 27.0 |
| Disperbyk ® 190 | 1.9 |
| Galoryl ® DT50 | 0.74 |
| pH adjuster | 0.50 |
| Biocide | 0.13 |
| Defoamer | 0.02 |
| Water | Balance |

TABLE 4

| Component | Example 4 |
|---|---|
| Dye Disperse Red 60 | 5.0 |
| Sorbitol | 5.6 |
| Xylitol | 5.0 |
| Glycerol | 22.0 |
| 50:50 mixture of propoxylated glycerol and fructose | 2.15 |
| Disperbyk ® 190 | 1.0 |
| Pluronic ® PE10500 | 0.83 |
| Galoryl ® DT50 | 0.76 |
| Lignosulfonate | 0.70 |
| pH adjuster | 0.20 |
| Biocide | 0.53 |
| Defoamer | 0.04 |
| Water | Balance |

TABLE 5

| Component | Example 5 |
|---|---|
| Dye Disperse Red 60 | 1.0 |
| Sorbitol | 8.4 |
| Xylitol | 6.0 |
| Glycerol | 30.0 |
| Disperbyk ® 190 | 0.20 |
| Pluronic ® PE10500 | 0.16 |
| Galoryl ® DT50 | 0.14 |
| Lignosulfonate | 0.13 |
| pH adjuster | 0.50 |
| Biocide | 0.11 |
| Defoamer | 0.02 |
| Water | Balance |

TABLE 6

| Component | Example 6 |
|---|---|
| Dye Disperse Blue 359 | 4.1 |
| Sorbitol | 5.6 |
| Xylitol | 6.2 |
| Glycerol | 20.0 |
| Pluronic ® PE10500 | 2.6 |

TABLE 6-continued

| Component | Example 6 |
| --- | --- |
| Lignosulfonate | 2.0 |
| pH adjuster | 0.20 |
| Biocide | 0.10 |
| Defoamer | 0.07 |
| Water | Balance |

TABLE 7

| Component | Example 7 |
| --- | --- |
| Dye Disperse Blue 72 | 4.5 |
| Sorbitol | 7.0 |
| Xylitol | 5.0 |
| Glycerol | 21.0 |
| Disperbyk ® 190 | 3.3 |
| POE-POP copolymer | 2.2 |
| pH adjuster | 0.50 |
| Biocide | 0.10 |
| Defoamer | 0.05 |
| Water | Balance |

TABLE 8

| Component | Example 8 |
| --- | --- |
| Dye Disperse Blue 360 | 2.2 |
| Dye Disperse Yellow 54 | 0.35 |
| Dye Disperse Orange 25 | 3.5 |
| Sorbitol | 7.0 |
| Xylitol | 5.0 |
| Glycerol | 23.8 |
| Disperbyk ® 190 | 2.7 |
| Pluronic ® PE10500 | 0.30 |
| Galoryl ® DT50 | 1.5 |
| pH adjuster | 0.50 |
| Biocide | 0.14 |
| Defoamer | 0.05 |
| Water | Balance |

TABLE 9

| Component | Example 9 |
| --- | --- |
| Dye Disperse Blue 360 | 0.44 |
| Dye Disperse Yellow 54 | 0.07 |
| Dye Disperse Orange 25 | 0.72 |
| Sorbitol | 7.0 |
| Xylitol | 5.0 |
| Glycerol | 26.5 |
| Disperbyk ® 190 | 0.60 |
| Pluronic ® PE10500 | 0.10 |
| Galoryl ® DT50 | 0.41 |
| pH adjuster | 0.50 |
| Biocide | 0.11 |
| Defoamer | 0.01 |
| Water | Balance |

Examples 10-18 and Comparative Examples 2-5. Decap Time

Examples 10-18 and Comparative Examples 2-5 were prepared by inkjet ink preparation techniques known to one of skill in the art, as described above.

TABLE 10

| Component | Example 10 | Example 11 | Example 12 | Example 13 |
| --- | --- | --- | --- | --- |
| Dye Disperse Yellow 54 | 2.70 | 0 | 0 | 0.35 |
| Dye Disperse Red 60 | 0 | 5.00 | 0 | 0 |
| Dye Disperse Blue 359 | 0 | 0 | 4.10 | 0 |
| Dye Disperse Blue 360 | 0 | 0 | 0 | 2.20 |
| Dye Disperse Orange 25 | 0 | 0 | 0 | 3.50 |
| Monopropylene glycol | 30.00 | 25.50 | 25.00 | 25.00 |
| Xylitol | 2.00 | 2.00 | 2.00 | 2.00 |
| Tamol ® NN9104 | 2.00 | 2.00 | 2.00 | 2.00 |
| Disperbyk ® 190 | 6.00 | 4.00 | 4.00 | 5.00 |
| Pluronic ® PE10500 | 0 | 0.16 | 2.60 | 0.30 |
| Oparyl ® DT505 | 0.09 | 0.76 | 0 | 0 |
| Zephrym ® 3300B | 0.20 | 0.20 | 0.20 | 0.20 |
| Lignosulfonate | 0 | 0.70 | 2.00 | 0 |
| Edaplan ® 482 | 2.00 | 1.50 | 1.50 | 1.50 |
| pH adjuster | 0.30 | 0.30 | 0.30 | 0.30 |
| Defoamer | 0.05 | 0.11 | 0.07 | 0.06 |
| Biocide | 0.30 | 0.30 | 0.30 | 0.30 |
| Water | Balance | Balance | Balance | Balance |

TABLE 11

| Component | Example 14 | Example 15 | Example 16 | Example 17 |
| --- | --- | --- | --- | --- |
| Dye Disperse Yellow 54 | 2.70 | 0 | 0 | 0.35 |
| Dye Disperse Red 60 | 0 | 5.00 | 0 | 0 |
| Dye Disperse Blue 359 | 0 | 0 | 4.10 | 0 |
| Dye Disperse Blue 360 | 0 | 0 | 0 | 2.20 |
| Dye Disperse Orange 25 | 0 | 0 | 0 | 3.50 |
| Ethylene glycol | 24.90 | 24.90 | 24.90 | 14.20 |
| Glycerol | 0 | 0 | 5.00 | 7.00 |
| Sorbitol | 7.00 | 7.00 | 7.00 | 7.00 |
| Urea | 5.00 | 5.00 | 5.00 | 5.00 |
| Disperbyk ® 190 | 3.30 | 1.00 | 0 | 2.70 |
| Pluronic ® PE10500 | 0 | 0.83 | 2.60 | 0.30 |
| Oparyl ® DT505 | 0.09 | 0.76 | 0 | 0 |
| Lignosulfonate | 0 | 0.70 | 2.00 | 0 |
| Surfynol ® 465 | 0 | 0 | 0.30 | 0 |
| pH adjuster | 0.30 | 0.30 | 0.30 | 0.30 |
| Defoamer | 0.04 | 0.06 | 0.05 | 0.09 |
| Biocide | 0.30 | 0.30 | 0.30 | 0.30 |
| Water | Balance | Balance | Balance | Balance |

TABLE 12

| Component | Comparative Example 2 | Comparative Example 3 | Comparative Example 4 | Comparative Example 5 |
| --- | --- | --- | --- | --- |
| Dye Disperse Yellow 54 | 2.70 | 0 | 0 | 0.35 |
| Dye Disperse Red 60 | 0 | 5.00 | 0 | 0 |
| Dye Disperse Blue 359 | 0 | 0 | 4.10 | 0 |
| Dye Disperse Blue 360 | 0 | 0 | 0 | 2.20 |
| Dye Disperse Orange 25 | 0 | 0 | 0 | 3.50 |
| Glycerol | 40.00 | 25.00 | 35.00 | 27.00 |
| Tamol ® NN9104 | 2.00 | 2.00 | 2.00 | 0 |
| Disperbyk ® 190 | 8.30 | 4.00 | 4.00 | 4.70 |
| Pluronic ® PE10500 | 0 | 1.10 | 2.60 | 0.30 |
| Tanemul ® 373 | 2.00 | 0 | 1.00 | 0 |
| Zephrym ® 3300B | 0 | 0.70 | 0 | 0.50 |
| Tego ® KL 245 | 0.20 | 0 | 0.20 | 0 |
| Oparyl ® DT505 | 0.09 | 0.76 | 0 | 1.50 |
| Lignosulfonate | 0 | 0.70 | 2.00 | 0 |
| Defoamer | 0.04 | 0.10 | 0.07 | 0.10 |
| Biocide | 0.30 | 0.30 | 0.30 | 0.30 |
| Water | Balance | Balance | Balance | Balance |

Examples 4, 6, 11, 12, 15, and 16 and Comparative Examples 3 and 4 were printed using a KYOCERA KJ4B printhead (available commercially from Kyocera Corporation, Kyoto, Japan) with native resolution of 600 dpi and drop volume of 12 pL. The frequency was 10 kHz and the meniscus pressure was approximately 11 mbar. The atmospheric conditions were a temperature of between 20 and 22° C. and a relative humidity of approximately 40%. Each of Examples 4, 6, 11, 12, 15, and 16, and Comparative Examples 3 and 4 printed without delay or missing nozzles with a drop size of 12 pL without leaving the printhead unparked at the capping station. Examples 4, 6, 15, and 16 exhibited a decap time of 30 minutes as they printed without delay or missing nozzles with a drop size of 12 pL. Examples 11 and 12 and Comparative Examples 4 and 5 failed to exhibit a decap time of 30 minutes as they printed with delay or missing nozzles with a drop size of 12 pL. These examples unexpectedly show that an increased concentration of a polyol having 5 or more carbon atoms appears to improve decap time.

Example 18

Example 18 was prepared by inkjet ink preparation techniques known to one of skill in the art, as described above.

TABLE 13

| Component | Example 18 |
| --- | --- |
| Dye Disperse Red 60 | 4.95 |
| Sorbitol | 8 |
| Xylitol | 0 |
| Glycerol | 26 |
| 50:50 mixture of propoxylated glycerol and fructose | 2.2 |
| Disperbyk ® 190 | 1 |
| Pluronic ® PE10500 | 0.87 |
| Galoryl ® DT50 | 0.76 |
| Lignosulfonate | 0.70 |
| pH adjuster | 0.20 |
| Defoamer | 0.11 |
| Biocide | 0.31 |
| Water | Balance |

Figure 4:
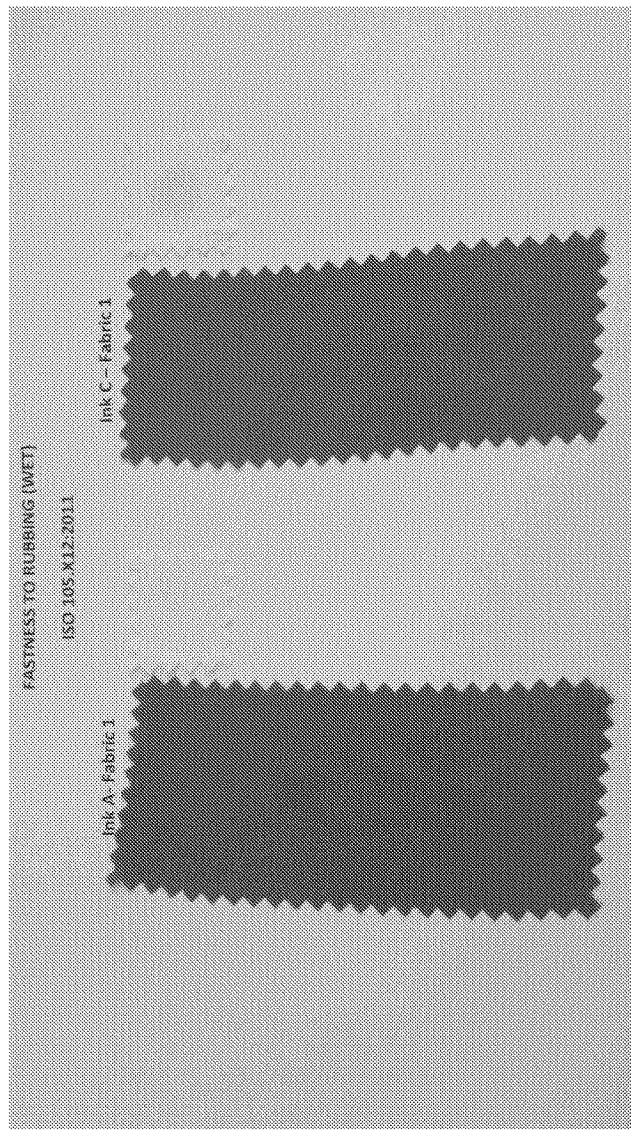
FIG. 4 shows a visual comparison of the color fastness to rubbing (wet) of Example 1 (left) and Example 22 (right).

Example 1 (Ink A) and Example 18 (Ink C) were each applied via direct inkjet printing to one ready-to-print polyester textile (Fabric 1) using a Mimaki JV4 (available commercially from Mimaki USA, Inc., Suwanee, Ga.) with 720×720 dpi and dry heat fixation at 210° C. for 30 seconds. The textiles resulting from printing on the ready-to-print polyester fabric were rubbed 10 times with a white piece of cotton soaked with water. FIG. 4 shows the results. Example 1 shows excellent color fastness to rubbing (wet), whereas Example 18 merely shows good color fastness to rubbing (wet).

What is claimed is:

1. A composition comprising:
    a disperse dye; and
    an aqueous carrier comprising a first polyol having at least 5 carbon atoms and a second polyol having at least 5 carbon atoms, wherein the first polyol is xylitol and the second polyol is sorbitol, and wherein the composition has a color fastness to water of at least 3 according to International Organization for Standardization test ISO 105-E01:2010 when used in direct inkjet printing on a ready-to-print polyester textile.

2. The composition of claim 1, the composition comprising disperse dye in an amount from about 0.1% to about 10% by weight of the composition, and wherein the disperse dye is selected from the group consisting of Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 160, Solvent Yellow 162, Solvent Violet 10, Solvent Black 29, and combinations thereof.

3. The composition of claim 1, the aqueous carrier comprising a total amount of polyol having at least 5 carbon atoms from about 6% to about 30% by weight of the composition.

4. The composition of claim 1, the aqueous carrier further comprising at least one of an anionic surfactant in an amount from about 0.1% to about 6% by weight of the composition, glycerol in an amount from about 15% to about 45% by weight of the composition, and a non-ionic surfactant in an amount from 0% to about 4% by weight of the composition.

5. The composition of claim 1, the composition comprising less than about 5% lignosulfonate.

6. The composition of claim 1, wherein direct inkjet printing does not require water.

7. The composition of claim 1, wherein the composition retains contact with the ready-to-print polyester textile for at least 10 seconds when delivered via an inkjet printer used in direct inkjet printing.

8. The composition of claim 1, wherein the composition has a decap time of at least about 30 seconds when used in direct inkjet printing.

9. The composition of claim 1, the composition having a viscosity of from about 1 cP to about 50 cP at about 35° C.

10. The composition of claim 1, the composition having a surface tension of from about 22 dynes/cm to about 50 dynes/cm.

11. The composition of claim 1, wherein the composition has a color fastness to wet rubbing of at least 3 or a color fastness to dry rubbing of at least 4 according to International Organization for Standardization test ISO 105-X12: 2001 when used in direct inkjet printing on a ready-to-print polyester textile.

12. The composition of claim 1, wherein the composition has a color fastness to acidic perspiration or a color fastness to alkaline perspiration of at least 3 according to International Organization for Standardization test ISO 105-E04: 2008 when used in direct inkjet printing on a ready-to-print polyester textile.

13. An inkjet cartridge comprising the composition of claim 1.

14. A method of direct inkjet printing on a first textile, the method comprising:
    contacting the first textile with the composition of claim 1 using an inkjet printer; and
    heating the first textile to a temperature from about 150° C. to about a melting point of the first textile for a time from about 1 second to about 1 hour to produce a printed textile.

15. The method of claim 14, wherein heating does not require water.

16. The method of claim 14, wherein the first textile is a polyester textile.

17. The method of claim 14, wherein the printed textile has a color fastness to water of at least 3 according to International Organization for Standardization test ISO 105-E01:2010 without rinsing the printed textile.

18. The method of claim 14, wherein the printed textile has a color fastness to wet rubbing of at least 3 or a color fastness to dry rubbing of at least 4 according to International Organization for Standardization test ISO 105-X12: 2001 without rinsing the printed textile.

19. The method of claim 14, wherein the printed textile has a color fastness to acidic perspiration or a color fastness to alkaline perspiration of at least 3 according to International Organization for Standardization test ISO 105-E04: 2008 without rinsing the printed textile.

* * * * *